(12) United States Patent
Wang et al.

(10) Patent No.: US 12,460,964 B2
(45) Date of Patent: Nov. 4, 2025

(54) DISTRIBUTED ACOUSTIC SENSING VOICE MESSAGE RECOGNITION SYSTEM AND METHOD

(71) Applicant: LASER INSTITUTE OF SHANDONG ACADEMY OF SCIENCES, Shandong (CN)

(72) Inventors: Chen Wang, Shandong (CN); Ying Shang, Shandong (CN); Shuai Qu, Shandong (CN); Jian Yang, Shandong (CN); Sheng Huang, Shandong (CN); Chang Li, Shandong (CN); Bing Cao, Shandong (CN); Weitao Wang, Shandong (CN); Jiasheng Ni, Shandong (CN)

(73) Assignee: LASER INSTITUTE OF SHANDONG ACADEMY OF SCIENCES, Shandong (CN)

( * ) Notice: Subject to any disclaimer, the term of this patent is extended or adjusted under 35 U.S.C. 154(b) by 67 days.

(21) Appl. No.: 18/532,166

(22) Filed: Dec. 7, 2023

(65) Prior Publication Data

US 2024/0201008 A1 Jun. 20, 2024

(30) Foreign Application Priority Data

Dec. 20, 2022 (CN) .......................... 202211636042.5

(51) Int. Cl.
*G01H 9/00* (2006.01)
*G01D 5/353* (2006.01)
(Continued)

(52) U.S. Cl.
CPC ......... *G01H 9/004* (2013.01); *G01D 5/35361* (2013.01); *G01H 9/00* (2013.01);
(Continued)

(58) Field of Classification Search
CPC ...... G01H 9/004; G01H 9/00; G01D 5/35361; G10L 15/063; G10L 15/08; G10L 15/20;
(Continued)

(56) References Cited

U.S. PATENT DOCUMENTS

2018/0143067 A1* 5/2018 Wang ..................... G01H 9/004
2019/0318755 A1 10/2019 Tashev et al.
(Continued)

FOREIGN PATENT DOCUMENTS

| CN | 103411660 A | 11/2013 |
| CN | 106525362 A | 3/2017 |

(Continued)

OTHER PUBLICATIONS

English Machine translation of CN114692681A (Year: 2022).*
(Continued)

*Primary Examiner* — Dominic J Bologna
(74) *Attorney, Agent, or Firm* — Christian S. Hans; Bret E. Field; Bozicevic, Field & Francis LLP (57) ABSTRACT

The application relates to a distributed acoustic sensing voice message recognition system and method. The system includes a sensing optical fiber, configured to receive a voice message and convert the voice message into a voice signal; a laser emission unit, configured to emit a laser signal with a narrow linewidth and with spontaneous emission noise being eliminated; a circulator, configured to transmit the laser signal to the sensing optical fiber to monitor the voice signal, and receive a backward Rayleigh scattering signal from the sensing optical fiber; a collection unit, configured to collect the backward Rayleigh scattering signal emitted by the circulator; and a convolutional recurrent network unit, configured to perform complex field mapping on the backward Rayleigh scattering signal collected by the collection unit, to reconstruct the voice signal.

9 Claims, 4 Drawing Sheets

(51) Int. Cl.
*G06N 3/044* (2023.01)
*G06N 3/045* (2023.01)
*G06N 3/0464* (2023.01)
*G10L 15/06* (2013.01)
*G10L 15/08* (2006.01)
*G10L 15/20* (2006.01)
*H04B 10/25* (2013.01)

(52) U.S. Cl.
CPC ............ *G10L 15/063* (2013.01); *G10L 15/08* (2013.01); *G10L 15/20* (2013.01); *H04B 10/25* (2013.01); *G06N 3/044* (2023.01); *G06N 3/045* (2023.01); *G06N 3/0464* (2023.01)

(58) Field of Classification Search
CPC ........ H04B 10/25; G06N 3/044; G06N 3/045; G06N 3/0464
See application file for complete search history.

(56) References Cited

U.S. PATENT DOCUMENTS

| | | | |
|---|---|---|---|
| 2020/0370950 A1* | 11/2020 | Ip | G01B 9/02015 |
| 2021/0010835 A1 | 1/2021 | Shang et al. | |
| 2023/0253003 A1* | 8/2023 | Liu | G10L 21/0232 704/200 |

FOREIGN PATENT DOCUMENTS

| | | | |
|---|---|---|---|
| CN | 108981767 A | | 12/2018 |
| CN | 110148420 A | | 8/2019 |
| CN | 113447110 A | | 9/2021 |
| CN | 113935467 A | | 1/2022 |
| CN | 113936681 A | | 1/2022 |
| CN | 114400018 A | | 4/2022 |
| CN | 114566180 A | | 5/2022 |
| CN | 114692681 A | * | 7/2022 |
| CN | 115326186 A | | 11/2022 |
| WO | WO2017054564 A1 | | 4/2017 |
| WO | WO2018082208 A1 | | 5/2018 |
| WO | WO2021093181 A1 | | 5/2021 |
| WO | WO2021251627 A1 | | 12/2021 |

OTHER PUBLICATIONS

Office Action and Search Report for Chinese Patent Application No. 202211636042.5, mailed on Jan. 30, 2023, 10 pages.
Search Report of Notification on Grant of Patent Right for Invention for Chinese Patent Application No. 202211636042.5, mailed on Feb. 24, 2023, 3 pages.
Li et al., Improved Algorithm of Speech Enhancement Based on Short-time Spectrum Estimation, Journal of Communication University of China (Science and Technology), Aug. 2016, vol. 23, No. 4, p. 65-69, and its English abstract.
Yang et al., An Experimental Distributed Temperature Sensing System Based on Optical Fiber Brillouin Scattering, Acta Photonica Sinica, Jan. 2003, vol. 32, No. 1, p. 14-17, and its English abstract.

* cited by examiner

DISTRIBUTED ACOUSTIC SENSING VOICE MESSAGE RECOGNITION SYSTEM AND METHOD

FIELD OF THE INVENTION

This application relates to the field of distributed optical fiber sensing technologies, and in particular, to a distributed acoustic sensing voice message recognition system and method.

BACKGROUND OF THE INVENTION

An optical fiber has characteristics of strong anti-electromagnetic interference, corrosion resistance, good electrical insulation, and light propagation. In recent years, distributed optical fiber sensing technologies using optical fibers as a sensing element and a signal transmission medium have attracted more attention of researchers in national defense, military, civil facilities, and other aspects. According to the distributed optical fiber sensing technology, feature information along an optical fiber direction is measured by detecting and analyzing an optical effect in the optical fiber. Since the feature information along the optical fiber changes with an external temperature, strain, vibration, and other parameters, environmental parameter information around the optical fiber can be sensed by using the distributed optical fiber sensing technology. The distributed optical fiber sensing technology mainly uses scattering effects of the optical fiber, such as Rayleigh scattering, Brillouin scattering, and Raman scattering to detect external information. As a representative of distributed optical fiber sensing systems, a distributed acoustic sensing (DAS) system based on a phase sensitive optical time domain reflection technology has advantages of light weight, a small volume, and high sensitivity, and can continuously detect temporal changes and spatial distribution information of disturbances, strains, and other external disturbances in a transmission process. Therefore, the DAS system has been widely applied in safety detection of large public facilities such as bridges, tunnels, and dams; or in safety prevention of gas transmission pipelines, large warehouses, oil depots, and mines; in national border security; and in other fields.

The DAS technology is mainly used to measure an interference effect between backward Rayleigh scattering light generated at different scattering points in the optical fiber. When a sensing optical fiber is disturbed by the external, a refractive index of the optical fiber at a corresponding position changes, resulting in a corresponding optical phase change. The optical phase change may be reflected in an amplitude of a backward Rayleigh scattering signal. Therefore, a final interference result directly reflects a position of the disturbance. Subsequently, a phase and strength feature information of a vibration signal can be obtained by applying a related demodulation algorithm for disturbance information.

At present, relevant research on the DAS mainly focuses on related demodulation of vibration acoustic signals. However, it is still a difficult problem to recognize a voice message along the optical fiber by using the DAS technology. In the DAS system, due to influence of factors such as system related hardware noise and environmental noise along the optical fiber, a real voice message is buried in the noise. As a result, it is difficult to read and recognize the voice message by analyzing a signal of the voice message directly by using a demodulation technology. Therefore, how to effectively recognize a voice signal along the optical fiber by using the DAS system is an important problem of the current DAS system.

SUMMARY OF THE INVENTION

This application provides a distributed acoustic sensing voice message recognition system, to resolve a problem in the prior art of how to effectively recognize a voice signal along an optical fiber by using a DAS system.

A first aspect of this application provides a distributed acoustic sensing voice message recognition system, including:

a sensing optical fiber, configured to receive a voice message and convert the voice message into a voice signal;

a laser emission unit, configured to emit a laser signal with a narrow linewidth and with spontaneous emission noise being eliminated;

a circulator, disposed on an optical fiber between the laser emission unit and the sensing optical fiber, wherein the circulator is configured to transmit the laser signal to the sensing optical fiber to monitor the voice signal, and receive a backward Rayleigh scattering signal from the sensing optical fiber;

a collection unit, connected to the circulator by using the optical fiber, wherein the collection unit is configured to collect the backward Rayleigh scattering signal emitted by the circulator; and a convolutional recurrent network unit, connected to the collection unit, wherein the convolutional recurrent network unit is configured to perform complex field mapping on the backward Rayleigh scattering signal collected by the collection unit, to reconstruct the voice signal.

In an embodiment, the laser emission unit includes a laser, an isolator, and a first filter that are sequentially disposed on the optical fiber, wherein the laser is configured to emit the laser signal with a narrow linewidth;

the isolator is configured to stop reflected light generated by the laser signal from returning to the laser; and the first filter is configured to filter out a non-operating band in the laser signal.

In an embodiment, the laser emission unit further includes a function generator, and an acousto-optic modulator and a first erbium doped fiber amplifier that are disposed on the optical fiber, wherein the function generator is connected to the acousto-optic modulator, and the function generator is configured to drive the acousto-optic modulator to operate, so that the laser signal passing through the acousto-optic modulator is modulated into a pulse laser signal; and the first erbium doped fiber amplifier is disposed between the acousto-optic modulator and the first filter, and the first erbium doped fiber amplifier is configured to amplify the pulse laser signal.

In an embodiment, the collection unit includes a second erbium doped fiber amplifier, a second filter, an interferometer, a detector, and an acquisition card that are sequentially disposed on an optical path, wherein the second erbium doped fiber amplifier is configured to receive the backward Rayleigh scattering signal emitted by the circulator, and amplify the backward Rayleigh scattering signal;

the second filter is configured to filter out a non-operating band in the backward Rayleigh scattering signal;

the unbalanced interferometer is configured to split the backward Rayleigh scattering signal whose non-operating band is filtered out into a plurality of optical signals;

the detector is configured to detect the optical signals split by the unbalanced interferometer; and the acquisition card is connected to the detector, and the acquisition card is configured to collect the optical signals detected by the detector.

In an embodiment, the unbalanced interferometer includes a first coupler, a delay optical fiber, and a second coupler that are sequentially disposed on the optical path, wherein the first coupler receives the backward Rayleigh scattering signal amplified by the second erbium doped fiber amplifier, and interferes the backward Rayleigh scattering signal into two first optical signals;

the delay optical fiber receives the two first optical signals coupled by the first coupler and transmits the same to the second coupler; and the second coupler receives the two first optical signals transmitted by the delay optical fiber, and interferes the two optical signals into three second optical signals.

In an embodiment, the first coupler is a 50:50 coupler; and the second coupler is a 3×3 coupler.

In an embodiment, the unbalanced interferometer is an unbalanced Mach-Zehnder interferometer.

In an embodiment, the convolutional recurrent network unit includes a first short-time Fourier transform layer, an encoding layer, a decoding layer, and a second short-time Fourier transform layer, wherein the first short-time Fourier transform layer is configured to perform short-time Fourier transform on the collected backward Rayleigh scattering signal;

the encoding layer is configured to extract feature information for the backward Rayleigh scattering signal performed with short-time Fourier transform, and memorize the feature information;

the decoding layer is configured to perform reverse convolution based on the feature information extracted by the encoding layer, to obtain a real part and an imaginary part of the backward Rayleigh scattering signal; and the second short-time Fourier transform layer is configured to combine the real part and the imaginary part, to perform short-time Fourier transform.

A second aspect of this application provides a distributed acoustic sensing voice message recognition method, applied to the distributed acoustic sensing voice message recognition system described above, the method including:

obtaining a first noise-containing signal, wherein the first noise-containing signal represents a backward Rayleigh scattering signal that is formed by a first voice signal monitored by a laser signal;

establishing a convolutional recurrent network model based on a non-linear mapping relationship between the first noise-containing signal and the first voice signal, wherein the first noise-containing signal serves as an input signal of the convolutional recurrent network model, and the first voice signal serves as an output signal of the convolutional recurrent network model;

training the convolutional recurrent network model by using an iterative estimation method of the convolutional recurrent network model; and inputting a second noise-containing signal to obtain a reconstructed second voice signal based on the trained convolutional recurrent network model, wherein the second voice signal represents a voice signal that is obtained by performing noise removing on the second noise-containing signal.

In an embodiment, the step of training the convolutional recurrent network model in a manner of training a noise signal through iterative estimation of the convolutional recurrent network model to obtain a voice signal includes:

mapping a complex spectrum of the first noise-containing signal to a complex spectrum of the reconstructed first voice signal;

performing short-time Fourier transform on the complex spectrum of the first noise-containing signal;

applying the complex spectrum that is of the first noise-containing signal and that is performed with short-time Fourier transform to a rectangular coordinate system, and establishing an amplitude spectrum and a phase spectrum, wherein the amplitude spectrum and the phase spectrum represent a spectrum graph of a non-linear mapping relationship between the first noise-containing signal and the first voice signal;

estimating a complex ideal ratio mask by using the convolutional recurrent network model, to obtain enhanced amplitude spectrum and phase spectrum of the first voice signal; and combining the enhanced amplitude spectrum and the enhanced phase spectrum, and then performing inverse short-time Fourier transform, to obtain the reconstructed first voice signal.

Beneficial effects of this application are as follows.

The sensing optical fiber collects an external voice message and converts the voice message into a voice signal. The laser emission unit emits the laser signal with a narrow linewidth and with spontaneous emission noise being eliminated. The circulator transmits the laser signal emitted by the laser emission unit to the sensing optical fiber to monitor the voice signal, and receives the backward Rayleigh scattering signal from the sensing optical fiber. The collection unit is connected to the circulator, and collects the backward Rayleigh scattering signal emitted by the circulator. The convolutional recurrent network unit is connected to the collection unit, and performs complex field mapping on the backward Rayleigh scattering signal collected by the collection unit, to reconstruct the voice signal. By using the foregoing modes, the voice signals along the optical fiber can be effectively recognized, and an external voice signal received at the sensing optical fiber can be reconstructed, to make sense of the voice message at the sensing optical fiber based on the reconstructed voice signal.

BRIEF DESCRIPTION OF THE DRAWINGS

To more clearly describe the technical solutions of specific embodiments of this invention or in the prior art, the accompanying drawings required in the specific embodiments or in the prior art are briefly illustrated below. Apparently, the accompanying drawings in the description below are merely some embodiments of this invention, and other accompanying drawings can also be obtained by one of ordinary skills in the art according to these accompanying drawings without an effective effort.

LIST OF REFERENCE NUMERALS IN THE DRAWINGS

1 Laser
2 Isolator
3 Acousto-optic Modulator
4 Function Generator
5 First Erbium Doped Fiber Amplifier
6 First Filter
7 Circulator
8 Sensing Optical Fiber
9 Second Erbium Doped Fiber Amplifier
10 Second Filter
11 First Coupler
12 Delay Optical Fiber
13 Second Coupler
14 Detector
15 Acquisition card

DETAILED DESCRIPTION OF THE EMBODIMENTS

The technical solutions of this invention are clearly and completely described below in combination with the embodiments. Obviously, the described embodiments are merely some embodiments of this invention and are not all embodiments. According to the embodiments in this invention, all other embodiments derived by one of ordinary skills in the art without an effective effort belong to the protection scope of this invention.

Figure 1:
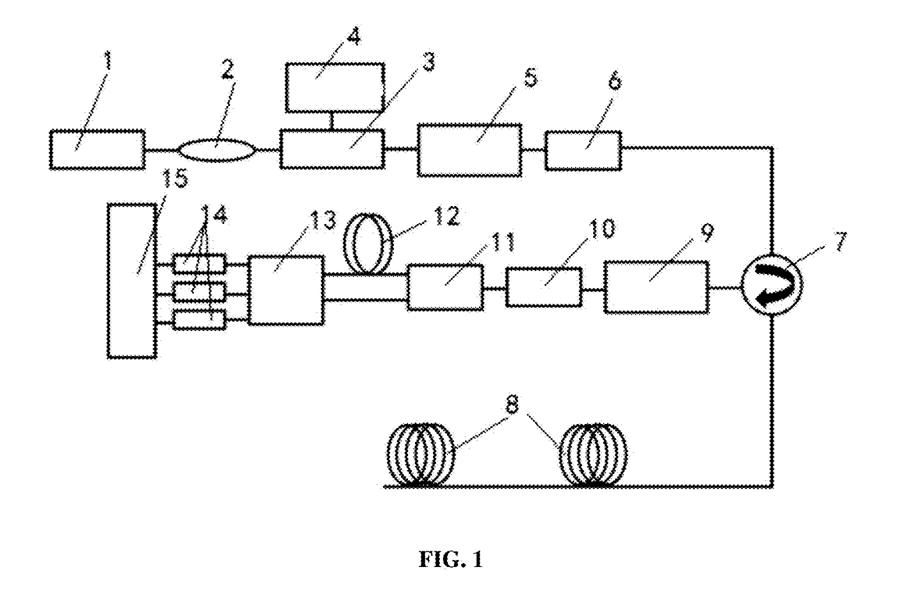
FIG. 1 is a schematic structural diagram of a distributed acoustic sensing voice message recognition system according to this application.

As shown in FIG. 1, a distributed acoustic sensing voice message recognition system according to this application includes a sensing optical fiber 8, a laser emission unit, a circulator 7, a collection unit, and a convolutional recurrent network unit.

The sensing optical fiber 8 is configured to receive a voice message and convert the voice message into a voice signal. The sensing optical fiber 8 can collect an external voice message, that is, collect external vibration; and convert vibration frequency into an optical signal, that is, a voice signal, so that the voice signal can be transmitted in the sensing optical fiber 8 along an optical fiber.

The laser emission unit is configured to emit a laser signal with a narrow linewidth and with spontaneous emission noise being eliminated. The signal emitted by the laser emission unit is transmitted to the sensing optical fiber 8 along the optical fiber. Transmission of the laser signal in the optical fiber may form a scattering effect, and scattered laser may be transmitted in a direction reverse to the transmission direction of the laser signal.

The circulator 7 is an optical fiber circulator, and is disposed on an optical fiber between the laser emission unit and the sensing optical fiber 8. The circulator 7 is configured to transmit the laser signal to the sensing optical fiber 8 to monitor the voice signal, and receive a backward Rayleigh scattering signal from the sensing optical fiber 8.

It should be noted that the scattering effect keeps occurring during the transmission of the laser signal, to form the backward Rayleigh scattering signal. When the external voice message is received at the sensing optical fiber 8, and the voice message is converted into the voice signal, the voice signal may be transmitted to the circulator 7 together with the backward Rayleigh scattering signal in a reverse direction along the optical fiber. After receiving the backward Rayleigh scattering signal, the circulator 7 may transmit the backward Rayleigh scattering signal to the collection unit along a set optical fiber path.

The collection unit is connected to the circulator 7 by using the optical fiber. The collection unit is configured to collect the backward Rayleigh scattering signal emitted by the circulator 7. The collection unit can collect the backward Rayleigh scattering signal in the optical fiber, and convert the backward Rayleigh scattering signal into a signal that can be recognized by a computer program.

The convolutional recurrent network unit is connected to the collection unit. The convolutional recurrent network unit is configured to perform complex field mapping on the backward Rayleigh scattering signal collected by the collection unit, to reconstruct the voice signal.

It should be noted that, the backward Rayleigh scanning signal can be converted by the collection unit into a signal that can be recognized by the computer program, or can be converted at the convolutional recurrent network unit. This is not specifically limited in this embodiment.

In this embodiment, that the laser emission unit emits the laser signal with a narrow linewidth and with spontaneous emission noise being eliminated can not only prevent noise from interfering with the backward Rayleigh scanning signal carrying the voice signal, reduce computation load of the convolutional recurrent network unit, and improve computing efficiency and accuracy of voice signal reconstruction, but can also improve scattering of the laser signal by using the characteristic of the narrow linewidth, thereby further improving the backward Rayleigh scattering signal. In addition, the circulator 7 is used to enable a backward Rayleigh scattering signal generated on one optical fiber to be transmitted to another optical fiber, and be transmitted to the collection unit, thereby helping the collection unit collect the backward Rayleigh scattering signal. After collecting the signal, the collection unit may transmit the signal to the convolutional recurrent network unit. Subsequently, the convolutional recurrent network unit performs convolutional and recurrent training, complex field mapping, and a plurality of convolutions and recursion operations on the Rayleigh scattering signal, to extract features from the Rayleigh scattering signal, and then reconstructs the voice signal based on the extracted features. The external voice signal at the sensing optical fiber 8 can be restored based on the reconstructed voice signal. The distributed acoustic sensing voice message recognition system provided in this embodiment is particularly applicable in fields related to optical fiber sensing, and particular in fields such the safety detection field of large public facilities such as bridges, tunnels, and dams; safety prevention of gas transmission pipelines, large warehouses, oil depots, and mines; and national border security.

As shown in FIG. 1, in an embodiment, the laser emission unit includes a laser 1, an isolator 2, and a first filter 6 that are sequentially disposed on the optical fiber.

The laser 1 is configured to emit the laser signal with a narrow linewidth. Specifically, the laser 1 may be a narrow linewidth laser 1.

The isolator 2 is configured to stop reflected light generated by the laser signal from returning to the laser 1. The isolator 2 may be an optical isolator 2, which allows the laser signal to be transmitted in one direction along the optical fiber while prevents the laser signal from being transmitted in a reverse direction. The direction of the laser signal is limited, so that the laser signal is transmitted in only one direction. Light reflected by optical fiber echo can be isolated by the isolator 2, thereby improving transmission efficiency of the laser signal.

The first filter 6 is configured to filter out a non-operating band in the laser signal. The first filter 6 can enable particular frequency components in the laser signal to pass through, and greatly attenuate other frequency components. Interference noise can be filtered out by using the first filter 6, so that the backward Rayleigh scattering signal can be analyzed in subsequent operations. The first filter 6 eliminates the spontaneous emission noise in the laser signal.

In this embodiment, by using the laser 1, the isolator 2, and the first filter 6 that are sequentially disposed on the optical fiber, the emitted laser signal has a narrow linewidth, the laser signal emitted by the laser 1 by using the optical fiber is prevented from being reflected back to the laser 1, and the non-operating band is filtered out, thereby ensuring that the laser signal has the characteristic of the narrow linewidth with the spontaneous emission noise being eliminated.

As shown in FIG. 1, in an embodiment, the laser emission unit further includes a function generator 4, and an acousto-optic modulator 3 and a first erbium doped fiber amplifier 5 that are disposed on the optical fiber.

The function generator 4 is connected to the acousto-optic modulator 3. The function generator 4 is a signal generator. The acousto-optic modulator 3 controls variations in strength of a laser beam, to generate a modulated pulse signal. The function generator 4 is configured to drive the acousto-optic modulator 3 to operate, so that the laser signal passing through the acousto-optic modulator 3 is modulated into a pulse laser signal.

The first erbium doped fiber amplifier 5 is disposed between the acousto-optic modulator 3 and the first filter 6. The first erbium doped fiber amplifier 5 is configured to amplify the pulse laser signal. The non-operating band in the pulse laser signal amplified by the first erbium doped fiber amplifier 5 may be further filtered out by the first filter 6.

In this embodiment, the laser signal is formed into the pulse laser signal by using the function generator 4 and the acousto-optic modulator 3. The pulse laser signal is emitted to the first filter 6 after being amplified by the first erbium doped fiber amplifier 5. In this way, not only a transmission distance of the laser signal in the optical fiber is increased, but a volume of the laser emission unit can also be reduced.

As shown in FIG. 1, in an embodiment, the collection unit includes a second erbium doped fiber amplifier 9, a second filter 10, an interferometer, a detector 14, and an acquisition card 15 that are sequentially disposed on an optical path.

The second erbium doped fiber amplifier 9 is configured to receive the backward Rayleigh scattering signal emitted by the circulator 7, and amplify the backward Rayleigh scattering signal. The second erbium doped fiber amplifier 9 has a same function as the first erbium doped fiber amplifier 5, and details are not described herein again.

The second filter 10 is configured to filter out a non-operating band in the backward Rayleigh scattering signal. The second filter 10 has a same function as the first filter 6, and details are not described herein again.

The unbalanced interferometer is configured to split the backward Rayleigh scattering signal whose non-operating band is filtered out into a plurality of optical signals. The unbalanced interferometer is an interferometer with unequal arm lengths of two interference arms in an initial state. The laser signal is interfered by the unbalanced interferometer.

The unbalanced interferometer includes a first coupler 11, a delay optical fiber 12, and a second coupler 13 that are sequentially disposed on the optical path. Phase information of a wave of the laser signal is obtained by using the unbalanced interferometer, to obtain a required physical quantity.

Specifically, the first coupler 11 receives the backward Rayleigh scattering signal amplified by the second erbium doped fiber amplifier 9, and interferes the backward Rayleigh scattering signal into two first optical signals.

The delay optical fiber 12 receives the two first optical signals coupled by the first coupler 11 and transmits the same to the second coupler 13.

The second coupler 13 receives the two first optical signals transmitted by the delay optical fiber 12, and interferes the two first optical signals into three second optical signals.

In this way, the Rayleigh scattering signal can be formed into two collimated beams by using the first coupler 11. Subsequently, a relative displacement generated by the two collimated beams may change due to different paths of the delay optical fiber 12 and different media. Finally, the second coupler 13 can be used to interfere with the two collimated beams that generate a relative displacement change, to form a plurality of beams that are respectively shot to the detector 14.

Preferably, the first coupler 11 is a 50:50 coupler. The second coupler 13 is a 3×3 coupler. The unbalanced interferometer is an unbalanced Mach-Zehnder interferometer.

The detector 14 may be an optical detector. Preferably, there are three detectors 14, and the three detectors 14 are respectively configured to detect the optical signals split by the unbalanced interferometer. In this way, the three detectors 14 can calculate the voice signal by using a 3×3 demodulation algorithm.

The acquisition card 15 is respectively connected to the three detectors 14, and the acquisition card 15 is configured to collect the optical signals detected by the detectors 14.

In this embodiment, the backward Rayleigh scattering signal is amplified by using the second erbium doped fiber amplifier 9, and then the spontaneous emission noise is eliminated by using the second filter 10. Finally, the backward Rayleigh scattering signal is interfered by using the unbalanced interferometer, to obtain the phase information in the backward Rayleigh scattering signal. Subsequently, the detector 14 can transmit the signal output by the unbalanced interferometer to the acquisition card 15, so that the acquisition card 15 transmits the signal to the convolutional recurrent network unit.

Figure 2:
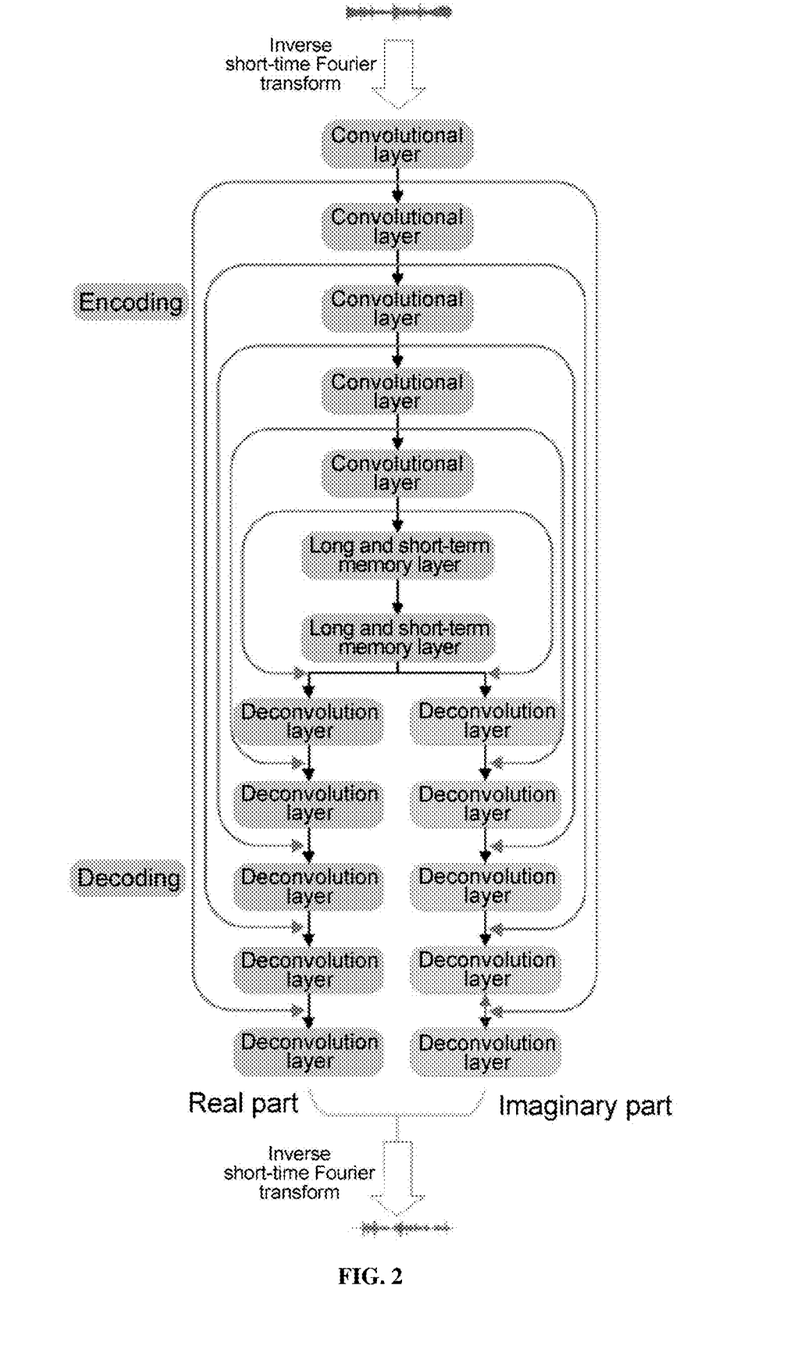
FIG. 2 is a schematic diagram of a convolutional recurrent network unit of a distributed acoustic sensing voice message recognition system according to this application.

As shown in FIG. 2, in an embodiment, the convolutional recurrent network unit includes a first short-time Fourier transform layer, an encoding layer, a decoding layer, and a second short-time Fourier transform layer.

The first short-time Fourier transform layer is configured to perform short-time Fourier transform on the collected backward Rayleigh scattering signal.

The encoding layer is configured to perform convolution for the backward Rayleigh scattering signal performed with short-time Fourier transform, extract feature information and memorize the feature information.

The decoding layer is configured to perform reverse convolution based on the feature information extracted by the encoding layer, to obtain a real part and an imaginary part of the backward Rayleigh scattering signal.

The second short-time Fourier transform layer is configured to combine the real part and the imaginary part, to perform short-time Fourier transform.

In this embodiment, by using an encoding and decoding, by iteratively estimating a non-linear mapping relationship between the noise-containing signal (the backward Rayleigh scattering signal collected by the collection unit) and a clean acoustic signal (a signal with noise removed, that is, the voice signal converted from the voice message received by the sensing optical fiber 8), a complex spectrum of the noise-containing signal is mapped to a complex spectrum of a reconstructed voice signal, thereby restoring a relatively clean acoustic signal.

Figure 3:
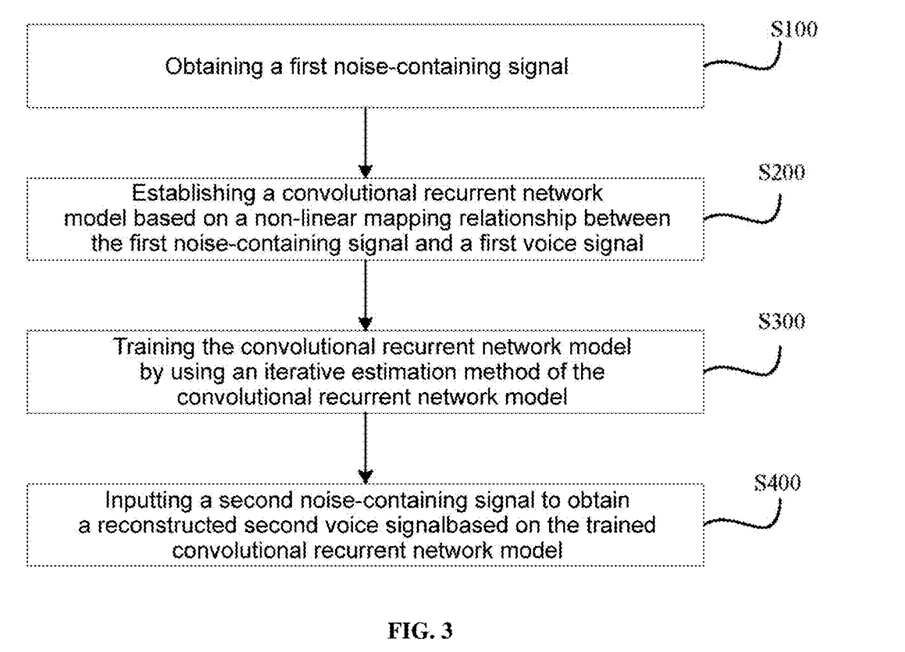
FIG. 3 is flowchart of a distributed acoustic sensing voice message recognition method according to this application.

As shown in FIG. 3, specifically, the convolutional recurrent network unit relates to a distributed acoustic sensing voice message recognition method. The method includes the following steps.

S100: Obtaining a first noise-containing signal, wherein the first noise-containing signal represents a backward Rayleigh scattering signal that is formed by a first voice signal monitored by a laser signal.

The first noise-containing signal transmitted by the acquisition card is obtained by the convolutional recurrent network unit. The laser signal represented by the first noise-containing signal is emitted by the laser emission unit, and the first voice signal is obtained by the sensing optical fiber. The backward Rayleigh scattering signal is formed by the laser signal carrying the first voice signal.

S200: Establishing a convolutional recurrent network model based on a non-linear mapping relationship between the first noise-containing signal and the first voice signal, wherein the first noise-containing signal serves as an input signal of the convolutional recurrent network model, and the first voice signal serves as an output signal of the convolutional recurrent network model.

The convolutional recurrent network model may be constructed based on a complex convolutional recurrent network (CCRN), or may be constructed based on another type of convolutional recurrent neural network. This is not limited in this embodiment.

The phase information obtained by demodulating, by using a host computer, the first noise-containing signal collected by the acquisition card is extracted based on a located position, and the first noise-containing signal and the first voice signal are simultaneously input into the convolutional recurrent network model in a form of sequences for training.

The located position refers to a position at which a distributed sensor monitors an acoustic vibration signal of the sensing optical fiber by using the optical fiber. The host computer can observe a position of vibration generated by an acoustic wave in the sensing optical fiber, to determine a position where the first voice signal is generated. For example, if the sensing optical fiber is mounted in a bridge, the host computer can determine where the first voice signal is sent from in the bridge.

It can be understood that an area covered by the sensing optical fiber has a certain range. There is no need to reconstruct and restore all first voice signals generated within the area covered by the sensing optical fiber, but only the first voice signal at a specified position needs to be restored. For this reason, the host computer extracts, based on the located position, the phase information that is obtained by demodulating the collected data.

S300: Training the convolutional recurrent network model by using an iterative estimation method of the convolutional recurrent network model.

Figure 4:
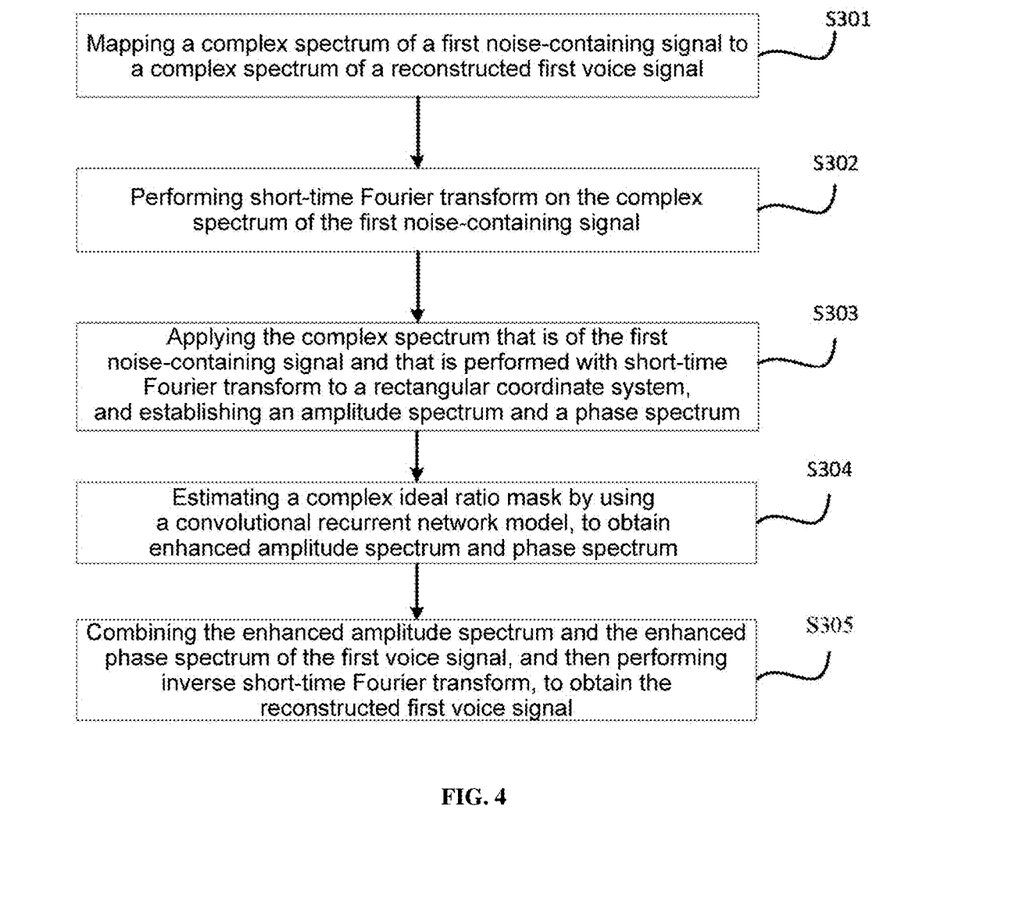
FIG. 4 is a flowchart of training a convolutional recurrent network model of a distributed acoustic sensing voice message recognition system according to this application.

As shown in FIG. 4, training the convolutional recurrent network model includes steps S301 to S305.

S301: Mapping a complex spectrum of the first noise-containing signal to a complex spectrum of the reconstructed first voice signal.

A purpose of mapping the complex spectrum is to extract an amplitude spectrum and a phase spectrum of the first voice signal from the first noise-containing signal, and simultaneously enhance an amplitude response and a phase response of the first voice signal. To be specific, the first noise-containing signal is represented by using the following formula:

$$y = x + n \qquad (1)$$

wherein y represents the first noise-containing signal: x represents the first voice signal: and n represents a noise signal except the first voice signal.

S302: Performing short-time Fourier transform on the complex spectrum of the first noise-containing signal.

Amplitude spectrum mapping is obtained by performing short-time Fourier transform on both sides of the equation of formula (1). The amplitude spectrum mapping is represented by using the following formula:

$$Y = X + N. \qquad (2)$$

wherein Y, X, and N respectively represent short-time Fourier transform corresponding to y, x, and n.

S303: Applying the complex spectrum that is of the first noise-containing signal and that is performed with short-time Fourier transform to a rectangular coordinate system, and establishing an amplitude spectrum and a phase spectrum, wherein the amplitude spectrum and the phase spectrum represent a spectrum graph of a non-linear mapping relationship between the first noise-containing signal and the first voice signal.

Mapping the complex spectrum is to apply the formula (2) to the rectangular coordinate system, and the formula is:

$$(Y_r + Y_i) = (X_r + N_r) + i(X_i + N_i) \qquad (3)$$

wherein r represents a real part of the amplifier spectrum, and i represents an imaginary part of the phase spectrum.

S304: Estimating a complex ideal ratio mask by using the convolutional recurrent network model, to obtain enhanced amplitude spectrum and phase spectrum.

The complex ideal ratio mask $\hat{M}$ is estimated by using the model, and the formula is:

$$\hat{M} = \hat{M}_r + i\hat{M}_i = \frac{Y_r X_r + Y_i X_i}{(Y_r)^2 + (Y_i)^2} + i\frac{Y_r X_r - Y_i X_i}{(Y_r)^2 + (Y_i)^2}. \qquad (4)$$

The enhanced amplitude spectrum and the enhanced phase spectrum of the first voice signal can be obtained through estimation $\hat{M}$ of a noise-containing spectrum by the complex ideal ratio mask, and can be used to reconstruct the first voice signal X. The formula is:

$$X = (\hat{M}_r \times Y_r) + i(\hat{M}_i \times Y_i). \qquad (5)$$

S305: Combining the enhanced amplitude spectrum and the enhanced phase spectrum of the first voice signal, and then performing inverse short-time Fourier transform, to obtain the reconstructed first voice signal.

The enhanced amplitude spectrum and the enhanced phase spectrum of the first voice signal are combined, and then inverse short-time Fourier transform is performed on the combined first voice signal. In this way, the enhanced first voice signal collected by a distributed acoustic sensing system can be obtained.

Through steps S301 to S305, the first noise-containing signal is continuously trained in the convolutional recurrent network model, so that the reconstructed voice signal can be obtained by inputting the noise-containing signal.

S400: Inputting a second noise-containing signal to obtain a reconstructed second voice signal based on the trained convolutional recurrent network model, wherein the second voice signal represents a voice signal that is obtained by performing noise removing on the second noise-containing signal.

After the convolutional recurrent network model is trained for a plurality of times, the reconstructed second voice signal can be obtained by inputting the second noise-containing signal. The second noise-containing signal represents an actual noise-containing signal, and the second voice signal represents a voice signal that is actually required to be obtained and that is converted from a voice message received by the sensing optical fiber.

In view of the above, the distributed acoustic sensing voice message recognition system and method provided in this application have the following advantages.

1. The voice signal collected by the distributed acoustic sensing system can be effectively processed, and a signal-to-noise ratio of the voice signal can be improved, thereby improving quality of the voice signal.
2. Recognition of the voice signal is realized, and an application scope of the distributed acoustic sensing system is further expanded, thereby providing a new potential possibility for a long-distance speech recognition system.
3. A measurement capability of the distributed acoustic sensing system is improved.
4. The system and the method can be widely applied in national defense, military, civil facilities, and other fields.

The foregoing embodiments are merely specific embodiments of this invention, and the descriptions are relatively specific and detailed, but should not be construed as limitation to this invention. It should be noted that for persons of ordinary skills in the art, several deformations and improvements can be further made without departing from the concept of this invention, and the deformations and improvements all fall within the protection scope of this invention.

What is claimed is:

1. A distributed acoustic sensing voice message recognition system, comprising:
    a sensing optical fiber, configured to receive a voice message and convert the voice message into a voice signal;
    a laser emission unit comprising a laser and an isolator that are sequentially disposed on the optical fiber; wherein the laser is configured to emit the laser signal with a narrow linewidth, and the isolator is configured to stop reflected light generated by the laser signal from returning to the laser;
    a circulator, disposed on an optical fiber between the laser emission unit and the sensing optical fiber, wherein the circulator is configured to transmit the laser signal to the sensing optical fiber to monitor the voice signal, and receive a backward Rayleigh scattering signal from the sensing optical fiber;
    a collection unit, connected to the circulator by using the optical fiber to collect the backward Rayleigh scattering signal emitted by the circulator; and
    a convolutional recurrent network unit, connected to the collection unit, wherein the convolutional recurrent network unit is configured to perform complex field mapping on the backward Rayleigh scattering signal collected by the collection unit, to reconstruct the voice signal,
    wherein the convolutional recurrent network unit relates to a convolutional recurrent network model that is trained by using an iterative estimation method of the convolutional recurrent network model;
    wherein the convolutional recurrent network unit is further configured to map a complex spectrum of the backward Rayleigh scattering signal to a complex spectrum of the reconstructed voice signal;
    performing short-time Fourier transform on the complex spectrum of the backward Rayleigh scattering signal;
    applying the complex spectrum that is of the backward Rayleigh scattering signal and that is performed with short-time Fourier transform to a rectangular coordinate system, and establishing an amplitude spectrum and a phase spectrum, wherein the amplitude spectrum and the phase spectrum represent a spectrum graph of a non-linear mapping relationship between the backward Rayleigh scattering signal and the voice signal;
    estimating a complex ideal ratio mask by using the convolutional recurrent network model, to obtain enhanced amplitude spectrum and phase spectrum of the voice signal; and
    combining the enhanced amplitude spectrum and the enhanced phase spectrum, and then performing inverse short-time Fourier transform, to obtain the reconstructed voice signal.

2. The distributed acoustic sensing voice message recognition system according to claim 1, wherein the laser emission unit further comprises a first filter that is sequentially disposed on the optical fiber after the laser and the isolator;
    wherein the first filter is configured to filter out a non-operating band in the laser signal.

3. The distributed acoustic sensing voice message recognition system according to claim 2, wherein the laser emission unit further comprises a function generator, and an acousto-optic modulator and a first erbium doped fiber amplifier that are disposed on the optical fiber;
    wherein the function generator is connected to the acousto-optic modulator, and the function generator is configured to drive the acousto-optic modulator to operate, so that the laser signal passing through the acousto-optic modulator is modulated into a pulse laser signal; and
    the first erbium doped fiber amplifier is disposed between the acousto-optic modulator and the first filter, and the first erbium doped fiber amplifier is configured to amplify the pulse laser signal.

4. The distributed acoustic sensing voice message recognition system according to claim 1, wherein the collection unit comprises a second erbium doped fiber amplifier, a second filter, an unbalanced interferometer, a detector, and an acquisition card that are sequentially disposed on an optical path;

wherein the second erbium doped fiber amplifier is configured to receive the backward Rayleigh scattering signal emitted by the circulator, and amplify the backward Rayleigh scattering signal;

the second filter is configured to filter out a non-operating band in the backward Rayleigh scattering signal;

the unbalanced interferometer is configured to split the backward Rayleigh scattering signal whose non-operating band is filtered out into a plurality of optical signals;

the detector is configured to detect the optical signals split by the unbalanced interferometer; and the acquisition card is connected to the detector, and the acquisition card is configured to collect the optical signals detected by the detector.

5. The distributed acoustic sensing voice message recognition system according to claim 4, wherein the unbalanced interferometer comprises a first coupler, a delay optical fiber, and a second coupler that are sequentially disposed on the optical path;

the first coupler receives the backward Rayleigh scattering signal amplified by the second erbium doped fiber amplifier, and interferes the backward Rayleigh scattering signal into two first optical signals;

the delay optical fiber receives the two first optical signals coupled by the first coupler and transmits the same to the second coupler; and the second coupler receives the two first optical signals transmitted by the delay optical fiber, and interferes the two optical signals into three second optical signals.

6. The distributed acoustic sensing voice message recognition system according to claim 5, wherein the first coupler is a 50:50 coupler; and the second coupler is a 3×3 coupler.

7. The distributed acoustic sensing voice message recognition system according to claim 4, wherein the unbalanced interferometer is an unbalanced Mach-Zehnder interferometer.

8. The distributed acoustic sensing voice message recognition system according to claim 4, wherein the convolutional recurrent network unit comprises a first short-time Fourier transform layer, an encoding layer, a decoding layer, and a second short-time Fourier transform layer;

wherein the first short-time Fourier transform layer is configured to perform short-time Fourier transform on the collected backward Rayleigh scattering signal;

the encoding layer is configured to perform convolution for the backward Rayleigh scattering signal performed with short-time Fourier transform, extract feature information and memorize the feature information;

the decoding layer is configured to perform reverse convolution based on the feature information extracted by the encoding layer, to obtain a real part and an imaginary part of the backward Rayleigh scattering signal; and the second short-time Fourier transform layer is configured to combine the real part and the imaginary part, to perform short-time Fourier transform.

9. A distributed acoustic sensing voice message recognition method, applied to the distributed acoustic sensing voice message recognition system according to claim 1, the method comprising:

obtaining a first noise-containing signal, wherein the first noise-containing signal represents a backward Rayleigh scattering signal that is formed by a first voice signal monitored by a laser signal;

establishing a convolutional recurrent network model based on a non-linear mapping relationship between the first noise-containing signal and the first voice signal, wherein the first noise-containing signal serves as an input signal of the convolutional recurrent network model, and the first voice signal serves as an output signal of the convolutional recurrent network model;

training the convolutional recurrent network model by using an iterative estimation method of the convolutional recurrent network model; and inputting a second noise-containing signal to obtain a reconstructed second voice signal based on the trained convolutional recurrent network model, wherein the second voice signal represents a voice signal that is obtained by performing noise removing on the second noise-containing signal, wherein the step of training the convolutional recurrent network model in a manner of training a noise signal through iterative estimation of the convolutional recurrent network model to obtain a voice signal comprises:

mapping a complex spectrum of the first noise-containing signal to a complex spectrum of the reconstructed first voice signal;

performing short-time Fourier transform on the complex spectrum of the first noise-containing signal;

applying the complex spectrum that is of the first noise-containing signal and that is performed with short-time Fourier transform to a rectangular coordinate system, and establishing an amplitude spectrum and a phase spectrum, wherein the amplitude spectrum and the phase spectrum represent a spectrum graph of a non-linear mapping relationship between the first noise-containing signal and the first voice signal;

estimating a complex ideal ratio mask by using the convolutional recurrent network model, to obtain enhanced amplitude spectrum and phase spectrum of the first voice signal; and combining the enhanced amplitude spectrum and the enhanced phase spectrum, and then performing inverse short-time Fourier transform, to obtain the reconstructed first voice signal.

* * * * *